United States Patent Office 2,791,602
Patented May 7, 1957

2,791,602

HYPNOTIC AGENT AND INTERMEDIATE

Abraham Bavley, Brooklyn, and William M. McLamore, Fresh Meadows, N. Y., assignors to Chas. Pfizer & Co., Inc., Brooklyn, N. Y., a corporation of Delaware No Drawing. Application April 29, 1954,
Serial No. 426,589

5 Claims. (Cl. 260—463)

This invention relates to certain new organic compounds useful in inducing hypnosis in animals and in protecting them against convulsive seizures, to processes for the production of such compounds, and to therapeutic compositions containing the same.

While various substances are known to induce hypnosis and related effects in animals, many such substances are deficient in one or more respects. For example, certain of them require rather large doses to induce any appreciable degree of hypnosis. Others exhibit undesirable side- or after-effects, and some are sufficiently toxic to necessitate great care in their use. Furthermore, some also induce on continued use a degree of dependence which approaches habituation.

In our co-pending application Serial No. 349,938, filed April 20, 1953 and now Patent No. 2,746,900 of May 22, 1956 there is described a class of vinyl ethinyl tertiary carbinols which are highly effective hypnotic and/or anti-convulsant agents. These compounds occur for the most part in the liquid state, and therefore, are most conveniently administered in capsule form. However, encapsulation of liquid pharmaceutical products is an expensive operation, and accordingly, is to be avoided if possible.

It has now been found that the carbamates of the vinyl ethinyl tertiary carbinols described in our aforesaid application retain the high order of activity of such carbinols, and moreover, occur in the solid state, thereby rendering them especially suited to tabletting in lieu of encapsulation. Furthermore, these carbamates exhibit low toxicities when administered to animals in toxicity tests. These characteristics render them particularly advantageous as hypnotic and anti-convulsant agents.

The vinyl ethinyl tertiary carbamates of this invention may be designated by the following structural formula:

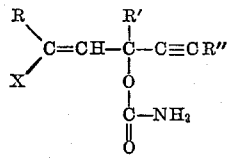

wherein R is hydrogen or an alkyl group of from 1 to 6 carbon atoms; R' is an alkyl group of from 1 to 7 carbon atoms, preferably an ethyl group; R'' is hydrogen, an alkyl group of from 1 to 6 carbon atoms, or halogen, preferably chlorine or bromine; and X is halogen, preferably chlorine or bromine.

As in our aforesaid application relating to the carbinols, the presence of a halogen atom (X) on the terminal vinyl carbon atom appears to confer unusual hypnotic activity on these compounds. While the derivatives of this class wherein R' is a methyl group are quite useful in this respect, we have found those compounds where R' is ethyl to be particularly useful.

The above compounds are prepared by treating a halogen-substituted vinyl ethinyl tertiary carbinol of the general formula

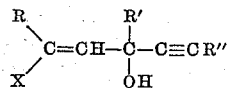

R, R', R'' and X being as defined above, with an aromatic chloroformate to form the corresponding aromatic carbonate, followed by treatment of the carbonate with ammonia. The halogen-substituted vinyl ethinyl tertiary carbinols may in turn be prepared by treating an appropriate halogenated vinyl ketone with an alkali metal salt of an acetylenic compound as described in our application Serial No. 349,938 filed April 20, 1953 and now Patent No. 2,746,900 of May 22, 1956. Specific examples of such carbinols are:

Methyl β-chlorovinyl ethinyl carbinol
Ethyl β-chlorovinyl ethinyl carbinol
Propyl β-chlorovinyl ethinyl carbinol
Hexyl β-chlorovinyl ethinyl carbinol
Heptyl β-chlorovinyl ethinyl carbinol
Methyl β-chloropropenyl ethinyl carbinol
Ethyl β-chlorooctenyl ethinyl carbinol
Propyl β-chloropheptenyl ethinyl carbinol
Butyl β-bromobutenyl ethinyl carbinol
Hexyl β-bromopentenyl ethinyl carbinol
Heptyl β-bromohexenyl ethinyl carbinol
Methyl β-chlorovinyl propinyl carbinol
Ethyl β-chlorovinyl butinyl carbinol
Propyl β-chlorovinyl octinyl carbinol In accordance with the present invention the aromatic chloroformate is slowly added to a solution of the tertiary carbinol in the presence of a tertiary organic base, preferably one which also acts as a solvent. Suitable bases include triethylamine, dimethyl aniline, coal tar bases, such as pyridine, picolines, collidines, lutidines, quinolines and substituted quinolines, and mixtures thereof. The base is used in an amount sufficient to combine with the hydrogen chloride liberated by the reaction between the tertiary carbinol and the chloroformate, at least one mole of base per mole of carbinol being preferred for best results. Illustrative of the aromatic chloroformates are the following: phenyl chloroformate, alkylated phenyl chloroformates, α-naphthyl chloroformate, β-naphthyl chloroformate, and the like. The reaction is preferably conducted under anhydrous conditions with cooling, a reaction time of from about 2 to 5 hours being sufficient in most instances. Upon the addition of water, the aryl carbonate of the tertiary carbinol may be extracted with ether. After several extractions of the carbonate with ether, the ether extracts may be combined and washed with hydrochloric acid to remove excess base from the ether solution, followed by saturated sodium chloride solution containing excess sodium bicarbonate to neutralize and partially dry the ether solution. The ether solution containing the aryl carbonate of the vinyl ethinyl tertiary carbinol is then conveniently dried with a suitable drying agent, such as anhydrous magnesium sulfate, and filtered. The resulting solution may be used directly for preparation of the carbamate or it may be concentrated to give the crude aromatic carbonate of the tertiary carbinol. The intermediate carbonates so produced are also new compounds and may be represented by the following structural formula:

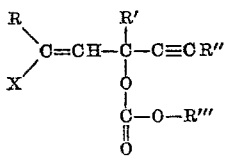

R, R', R" and X having the same significance as previously indicated, and R'" being an aromatic or substituted aromatic group.

The desired carbamates are preferably prepared by treating the above aromatic carbonates with ammonia directly, i. e. without isolation of the carbonate. In this connection, several procedures may be employed. For instance, ammonia may be bubbled slowly through an ether solution of the aromatic carbonate at room temperature for about 10 to 20 hours to convert the latter to the corresponding carbamate. Alternatively, an ether solution of the crude aromatic carbonate may be added to liquid ammonia and reacted for 10 to 24 hours, while permitting the ammonia to reflux and evaporate slowly. This method is to be preferred for best results. In still another procedure, the ether solution of aromatic carbonate as above prepared may be concentrated and treated with saturated ethanolic ammonia, and the resultant mixture left at room temperature for about the same time as aforesaid to complete the reaction.

In all of the described procedures, the resulting carbamate may be conveniently taken up in water and ether, and extracted with additional ether to remove the desired product from by-products and impurities. The ether extract may then be washed with sodium hydroxide solution to remove the phenolic by-products of the reaction, after which it is washed with saturated sodium chloride solution. The ether solution is then dried and concentrated to a low volume. Thereafter, the addition of petroleum ether precipitates the carbamate, which occurs as a white solid. It may readily be recrystallized from a mixture of ether and petroleum ether for purification purposes.

The preparation of the compounds of this invention may be further understood from the following examples which are given by way of illustration and are not intended as a limitation of the invention.

*Example I.—Phenyl carbonate of ethyl-β-chlorovinyl ethinyl carbinol*

39 g. of phenyl chloroformate (0.249 mole) were added dropwise to a stirred, ice-cooled solution of 39.6 g. ethyl β-chlorovinyl ethinyl carbinol (0.274 mole) in 100 ml. of anhydrous pyridine. Thereafter, the suspension of solid was stirred with cooling for 2 to 3 hours. 150 ml. of water and 150 ml. of ether were added, and the aqueous layer was extracted with several fresh portions of ether. The combined ether extracts were washed with 300 ml. of cold 18% hydrochloric acid in two portions and finally with saturated sodium chloride solution containing excess sodium bicarbonate. The ether layer was dried with anhydrous magnesium sulfate and filtered. At this point the ether solution may be used directly for preparation of the carbamate or it may be concentrated to give the crude phenyl carbonate of the ethyl-β-chlorovinyl ethinyl carbinol.

*Example II.—Carbamate of ethyl-β-chlorovinyl carbinol*

Ammonia was bubbled slowly during eight hours through an ether solution of the phenyl carbonate of ethyl β-chlorovinyl ethinyl carbinol prepared as in Example I from 6.6 g. of the carbinol. Although a condenser was used, most of the ether was lost during this treatment. The reddish, semi-solid residue was taken up in water and additional ether, and the aqueous layer was extracted with several further portions of ether. The combined ether extracts were washed twice with 50 ml. portions of 2.5% sodium hydroxide solution and finally with saturated sodium chloride solution. The ether solution was dried with anhydrous magnesium sulfate, then concentrated to a low volume and diluted with petroleum ether. The carbamate precipitated at this point as a white solid, which was recrystallized from ether-petroleum ether to give 5.2 g. of colorless leaflets, M. P. 98.5–99.5° C. A further 0.3 g. was obtained from the filtrate; yield 5.5 g. (64% from the carbinol). The analytical sample was recrystallized from methanol-water as heavier crystals, M. P. 98.5–99.5° C.

*Analysis.*—Calc'd for: $C_8H_{10}O_2NCl$: percent C, 51.21; percent H, 5.37; percent N, 7.47. Found: percent C, 51.43; percent H, 5.40; percent N, 7.42.

*Example III.—Carbamate of ethyl β-chlorovinyl ethinyl carbinol*

125 ml. of an ether solution of the crude phenyl carbonate from 19.8 g. of ethyl β-chlorovinyl ethinyl carbinol, prepared as in Example I, were added to about 200 ml. of liquid ammonia and stirred overnight while the ammonia slowly evaporated. The residual solution was treated as in Example II, and the carbamate was obtained as 13.6 g. (53% yield) of colorless leaflets, M. P. 99–100° C.

*Example IV.—Carbamate of ethyl β-chlorovinyl ethinyl carbinol*

The crude phenyl carbonate from 19.8 g. of ethyl β-chlorovinyl ethinyl carbinol, obtained by careful concentration of an ether solution prepared in accordance with Example I, was taken up in 100 ml. of saturated ethanolic ammonia and left at room temperature overnight. The red solution which resulted was concentrated under mild conditions and the carbamate obtained as in Example II. The yellowish crystals weighed 10.9 (42.4% yield) and had M. P. 97–98° C.

*Example V.—Carbamate of methyl β-chlorovinyl ethinyl carbinol*

13.1 g. of methyl β-chlorovinyl ethinyl carbinol (0.10 mole) were treated in accordance with the procedure of Example I to form the corresponding carbonate of the methyl homolog. The crude phenyl carbonate thus formed was then added to liquid ammonia as in Example III to convert the intermediate mixed carbonate to the carbamate. After treating the residual solution as in Example II, the desired carbamate was obtained in an amount of 8.38 g. (48.3% yield), M. P. 92.9–93° C.

*Analysis.*—Calc'd for: $C_7H_8O_2NCl$: percent C, 48.43; percent H, 4.65; percent N, 8.07. Found: percent C, 48.25; percent H, 4.70; percent N, 8.07.

*Example VI.—Carbamate of n-propyl β-chlorovinyl ethinyl carbinol*

15.9 g. of n-propyl β-chlorovinyl ethinyl carbinol (0.10 mole) was treated as in Example V to obtain 5.86 g. (29.1% yield) of the corresponding carbamate, M. P. 63.9–64.8° C.

*Analysis.*—Calc'd for: $C_9H_{12}O_2NCl$: percent C, 53.60; percent H, 6.00; percent N, 6.95. Found: percent C, 53.62; percent H, 6.11; percent N, 6.93.

*Example VII.—Carbamate of i-propyl-β-chlorovinyl ethinyl carbinol*

In accordance with the procedure of Example V, 15.9 g. of i-propyl-β-chlorovinyl ethinyl carbinol (0.10 mole) were employed to prepare 1.3 g. of the corresponding carbamate (6.5% yield); M. P. 91–92° C.

*Analysis.*—Calc'd for: $C_9H_{12}O_2NCl$: percent C, 53.60; percent H, 6.00; percent N, 6.95. Found: percent C, 53.61; percent H, 5.90; percent N, 7.17.

In general, the carbamates of this invention are white solids which are readily adapted for therapeutic use.

Marked hypnosis has been observed in animals to which they have been administered, and the compounds have been found to protect such animals effectively against convulsive seizures. As previously pointed out, the toxicity of the compounds has been found to be low, and no harmful pharmacological effects have been observed as a result of their administration.

The above compounds may be employed in a variety of medicinal dosage forms, that is, they may be incorporated with various inert pharmaceutical carriers such as solid diluents, oils, etc., or with biologically active materials, in the form of tablets, capsules, elixirs, injectable solutions and the like. Because they are solids, they are particularly suitable for the manufacture of tablets for administration by the oral route. In general, the oral dosage forms may be sweetened and flavored with various materials of the type normally employed for that purpose.

When incorporated in such medicinal dosage forms the compounds may be present in concentrations ranging from about 0.5% by weight to about 90% by weight of the composition. Lower concentrations are generally not advisable since the volume of material which must be administered becomes excessive.

Resort may be had to such modifications and equivalents as fall within the scope of the invention and the scope of the appended claims.

We claim:
1. A compound having the following structure:

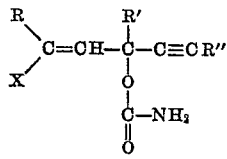

wherein R is selected from the group consisting of hydrogen and alkyl groups of from 1 to 6 carbon atoms; R' is an alkyl group of from 1 to 7 carbon atoms; R'' is selected from the group consisting of hydrogen, alkyl groups of from 1 to 6 carbon atoms, chlorine and bromine; and X is selected from the group consisting of chlorine and bromine.

2. A product in accordance with claim 1 wherein R and R'' are hydrogen, R' is an alkyl group of from 1 to 7 carbon atoms, and X is selected from the group consisting of chlorine and bromine.

3. Ethyl β-chlorovinyl ethinyl carbamate.

4. A compound having the following structure:

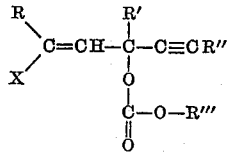

wherein R is selected from the group consisting of hydrogen and alkyl groups of from 1 to 6 carbon atoms; R' is an alkyl group of from 1 to 7 carbon atoms; R'' is selected from the group consisting of hydrogen, alkyl groups of from 1 to 6 carbon atoms, chlorine and bromine; R''' is selected from the group consisting of aromatic and alkyl substituted phenyl groups; and X is selected from the group consisting of chlorine and bromine.

5. The phenyl carbonate of ethyl β-chlorovinyl ethinyl carbinol.

References Cited in the file of this patent
UNITED STATES PATENTS

| 1,658,231 | Dox et al. | Feb. 7, 1928 |
| 2,385,932 | Muskat et al. | Oct. 2, 1945 |
| 2,517,965 | Bohl | Aug. 8, 1950 |
| 2,627,524 | Malkemus | Feb. 3, 1953 |

FOREIGN PATENTS

| 505,421 | Belgium | Oct. 15, 1951 |

OTHER REFERENCES

Munchener Medizinische Wochenschrift, vol. 95, July 17, 1953, page VII (advt.).

Rice: J. of Am. Pharm. Assn., vol. 33, sci. ed., September 1944, p. 293.

Papa: Archives of Biochem. and Biochem., vol. 33, October 1951, pp. 482 and 483.